US011045914B2

(12) United States Patent
Brueckl et al.

(10) Patent No.: US 11,045,914 B2
(45) Date of Patent: Jun. 29, 2021

(54) ALIGNMENT AND APPLICATION OF A DOOR SEAL OF A MOTOR VEHICLE

(71) Applicant: Bayerische Motoren Werke Aktiengesellschaft, Munich (DE)

(72) Inventors: Thomas Brueckl, Thalmassing (DE); Lukas Langgaertner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 350 days.

(21) Appl. No.: 16/124,902

(22) Filed: Sep. 7, 2018

(65) Prior Publication Data

US 2019/0001450 A1 Jan. 3, 2019

Related U.S. Application Data

(63) Continuation of application No. PCT/EP2017/053760, filed on Feb. 20, 2017.

(30) Foreign Application Priority Data

Mar. 9, 2016 (DE) ..................... 10 2016 203 842.7

(51) Int. Cl.
*B23P 19/00* (2006.01)
*B23P 19/04* (2006.01)
(Continued)

(52) U.S. Cl.
CPC ............. *B23P 19/047* (2013.01); *B60J 10/45* (2016.02); *B62D 65/06* (2013.01)

(58) Field of Classification Search
CPC . B23P 11/00; B23P 15/00; B23P 19/00; B23P 19/04; B60J 10/45; B60J 10/11; B60J 5/00; B62D 65/06
See application file for complete search history.

(56) References Cited

U.S. PATENT DOCUMENTS 6,024,348 A * 2/2000 Ventura ............... B05B 13/0285
269/104
7,008,166 B1 * 3/2006 Grimes ................... B66C 23/48
254/114
(Continued)

FOREIGN PATENT DOCUMENTS

CN 1298499 C 2/2007
CN 102858490 A 1/2013
(Continued)

OTHER PUBLICATIONS

Chinese-language Office Action issued in counterpart Chinese Application No. 201780004870.8 dated Aug. 2, 2019 with English translation (17 pages).
(Continued)

*Primary Examiner* — Lee D Wilson
(74) *Attorney, Agent, or Firm* — Crowell & Moring LLP

(57) ABSTRACT

A device for aligning a door seal when the door seal is applied to a door of a motor vehicle includes a receiving device for receiving the door in a defined manner, a holding device arranged on the receiving device for holding the door, a guiding device arranged on the receiving device and having a guiding strip for aligning the door seal in relation to the door when the door seal is applied to the door, and a rotation device for turning the receiving device about at least one axis of rotation.

2 Claims, 5 Drawing Sheets

(51) Int. Cl.
*B62D 65/06* (2006.01)
*B60J 10/00* (2016.01)

(56) References Cited

U.S. PATENT DOCUMENTS

| | | | |
|---|---|---|---|
| 9,358,564 B2* | 6/2016 | Deshler | ............... B05B 13/0285 |
| 2004/0211044 A1 | 10/2004 | Thommes et al. | |
| 2011/0099912 A1* | 5/2011 | Ohtake | ................... B60J 10/21 |
| | | | 49/502 |
| 2013/0037212 A1 | 2/2013 | Maischberger | |
| 2019/0001450 A1* | 1/2019 | Brueckl | ................... B60J 10/45 |

FOREIGN PATENT DOCUMENTS

| | | |
|---|---|---|
| DE | 101 31 981 A1 | 1/2003 |
| DE | 101 38 141 A1 | 3/2003 |
| DE | 10 2010 051 844 A1 | 5/2012 |
| EP | 2 283 964 A1 | 2/2011 |
| WO | WO 03/018250 A1 | 3/2003 |
| WO | WO 2011/134994 A1 | 11/2011 |

OTHER PUBLICATIONS

International Search Report (PCT/ISA/210) issued in PCT Application No. PCT/EP2017/053760 dated May 12, 2017 with English translation (six (6) pages).
German-language Written Opinion (PCT/ISA/237) issued in PCT Application No. PCT/EP2017/053760 dated May 12, 2017 (six (6) pages).
German-language Office Action issued in counterpart German Application No. 10 2016 203 842.7 dated Jul. 31, 2017 (two (2) pages).

* cited by examiner

ALIGNMENT AND APPLICATION OF A DOOR SEAL OF A MOTOR VEHICLE

CROSS REFERENCE TO RELATED APPLICATIONS

This application is a continuation of PCT International Application No. PCT/EP2017/053760, filed Feb. 20, 2017, which claims priority under 35 U.S.C. § 119 from German Patent Application No. 10 2016 203 842.7, filed Mar. 9, 2016, the entire disclosures of which are herein expressly incorporated by reference.

BACKGROUND AND SUMMARY OF THE INVENTION

The present invention relates to a device for aligning a door seal when the door seal is applied to a door of a motor vehicle, and to a system for applying a door seal to a door of a motor vehicle. Furthermore, the invention relates to a method for applying a door seal to a door of a motor vehicle.

Doors of motor vehicles generally have an encircling door seal in order to seal the closed door against a body of the motor vehicle. Door seals of this type carry out a plurality of technical functions here, such as, for example, preventing water from penetrating into an interior of the motor vehicle, damping a pulse during closing of the door, preventing direct contact of the door with the body, in particular to avoid rattling of the door, or the like. Known door seals have, for example, a tubular sealing body made from rubber or a comparable elastic material with an inner cavity. In order to fasten the sealing body to the door, the sealing bodies frequently have an adhesive strip which is outwardly protected by a protective strip, which has to be removed before or during the installation, in order thus, for example, to prevent inadvertent attaching of objects to the adhesive strip or of the adhesive strip to objects.

In order to ensure that the door seal optimally carries out the technical functions to be realized, a very precise arrangement of the door seal at a predetermined position on the door is required. Even slight deviations of the door seal from the predetermined position, by approximately a millimeter or by a few millimeters, can already lead to a seal being permeable to water or to there being a negative effect on the ease of closing or opening the door because of undefined forces between the body and door.

A multiplicity of different devices and methods are known for arranging door seals on doors. According to a first known method, a template which has a thickness of approximately 5 mm and is composed of a relatively flexible or labile material, for example of a plastic, is arranged on a door, which is held suspended on a hanging conveyor, and fixed, for example by clamping, bracing or by means of suction elements. The door seal can be aligned manually along a border edge of the template and, after removal of the protective strip, can be fitted by being pressed onto the door. This first method has the disadvantage that the template can easily be distorted and precise application of the door seal is therefore not ensured. Furthermore, an upper side and lower side of the door are accessible or visible only with difficulty, and therefore correct application of the door seal in these regions is possible only with difficulty. A further disadvantage is that a geometrical change in the template is possible only with difficulty.

According to a second method, a closed sealing ring is plugged onto clamping elements, which are configured, for example, as plastics plugs, of an application plate. By movement of the clamping elements away from one another, the sealing ring is stretched and an area enclosed by the sealing ring is therefore enlarged. The application plate is subsequently arranged on a door, for example with the aid of centering pins. The clamping elements are moved toward one another again, and therefore the sealing ring is deposited onto the door. This second method has the disadvantage that devices required for implementing said method cause high investment costs and the implementation requires a high outlay on personnel in comparison to a robot application. Furthermore, alignment of the door seal with respect to the door during the application can be monitored only with difficulty, and therefore positioning accuracy of the second method is frequently insufficient in the event of particularly exacting requirements placed on accurate positioning of the door seal. Finally, only closed sealing rings can be applied.

According to a third method, the door is brought up by a robot to an application head for applying the strand-like door seal which is coiled on a reel. The application head places the door seal on the door, while the robot rotates the door at the application head in order to apply the door seal. The third method has the disadvantage in particular that the robot required for implementing said method causes particularly high investment costs.

It is therefore the object of the present invention to eliminate, or at least partially to eliminate, the disadvantages described above in a device, a system and a method for applying a door seal to a door of a motor vehicle. In particular, it is the object of the present invention to provide a device for aligning a door seal when the door seal is being applied to a door of a motor vehicle, and a system and a method for applying a door seal to a door of a motor vehicle, which ensure reliable and precise alignment of the door seal with respect to the door during the application, even in mass manufacturing, in a simple and cost-effective manner.

The above object is achieved by a device, a system, and by a method in accordance with embodiments of the invention. Of course, features and details which are described in conjunction with the device for aligning a door seal when the door seal is applied to a door of a motor vehicle also apply here in conjunction with the system according to the invention and the method according to the invention for applying a door seal to a door of a motor vehicle, and vice versa in each case, and therefore, with regard to the disclosure, reference is always, and can always be, made reciprocally to the individual aspects of the invention.

According to a first aspect of the invention, the object is achieved by a device for aligning a door seal when the door seal is applied to a door of a motor vehicle. The device has a receiving device for receiving the door in a defined manner, a holding device which is arranged on the receiving device for holding the door, a guide device which is arranged on the receiving device with a guide track for aligning the door seal relative to the door when the door seal is applied to the door, and a rotation device for rotating the receiving device about at least one axis of rotation.

The device is configured for aligning the door seal on the door of the motor vehicle before or during an application process for applying the door seal to the door. For this purpose, the device has a receiving device which is configured for receiving the door in a defined manner. Within the context of the invention, receiving in a defined manner means that the door which is received has a defined relative position with respect to the receiving device. The receiving device has, for example, a basic body on which the holding device, the guide device and the rotation device are arranged. According to the invention, it can be provided that the holding device is arranged directly on the receiving device or on the receiving device via the guide device.

The holding device is configured for temporarily holding the door. The door can therefore be fixed by the holding device for the application process and can be released again from said holding device after the application process. The guide device has a guide track which defines a defined position of the door seal with respect to the door. Accordingly, the door seal can be aligned along the guide track and can therefore be easily correctly aligned with respect to the door. The guide track here is preferably configured in such a manner that a lateral stop for the door seal is provided. By this means, an alignment of the door seal on the guide track and therefore on the door is facilitated since, for this purpose, the door seal simply has to be brought into contact with the lateral stop. The guide device or at least the guide track is preferably white, or at least has a bright color, since door seals are generally black, and therefore a particularly good contrast with the door seal is provided. A correct arrangement of the door seal on the guide track is therefore facilitated with simple measures.

The rotation device is configured for rotating the receiving device about at least one axis of rotation. The holding device and the guide device are rotatable here together with the receiving device by the rotation device, and therefore a relative position of the holding device and guide device with respect to the receiving device is not changed by this rotation. During the rotation of the receiving device, the door seal can be arranged along the guide track. The rotation device is preferably arranged on a pedestal for placing the device on the floor.

By use of a device of this type, a door can be fixed in such a manner that no relative movement takes place or can take place between the door and the guide track. The guide track is arranged here along a track of the door, on which the door seal is to be arranged. Furthermore, the door seal can easily be aligned on the guide track of the guide device by way of a device of this type since, during the arranging of the door seal on the guide track, the receiving device can be rotated about the axis of rotation by the rotation device. If the alignment is intended to be undertaken manually by a worker, the door can therefore always be optimally aligned with respect to the worker. A current location on the door on which the door seal is to be arranged can therefore always be arranged, for example, in the direct field of view of the worker. A blind arrangement of the door seal on the guide device or an arrangement overhead is therefore not required. An alignment of the door seal with respect to the door is therefore ensured in a simple and cost-effective manner by means of the device according to the invention. The device according to the invention is particularly suitable for aligning a strand-like sealing tube which can be uncoiled, for example, from a reel. Sealing tubes of this type are more cost-effective than annular sealing tubes.

According to a preferred development of the invention, it can be provided, in a device, that the receiving device has an aligning device for receiving the door in a defined manner on the receiving device. An aligning device has, for example, a centering pin, one or more stop edges or the like. Easy and precise alignment of the door with respect to the receiving device and therefore also with respect to the guide device is therefore made possible. This is consequently of advantage for achieving a high degree of accuracy in the alignment of the door seal.

The holding device of a device preferably has at least one holding element, wherein the holding element is configured as a gripping element and/or suction element and/or clamping element. The holding elements can be actuable, for example, mechanically and/or pneumatically and/or hydraulically. A gripping element is configured, for example, in the form of tongs and for holding the door with a force fit and/or form fit. A suction element has, for example, a sucker made of rubber or silicone, which can be arranged on the door. The door can be fixed on the suction element by production of a negative pressure. A clamping element can be configured, for example, as a toggle lever in order, for example, to press the door against the receiving device by production of a clamping force and therefore to fix said door on the receiving device.

It can be provided, in the case of a device, that the holding device has a plurality of holding elements and the device has a first actuating device, wherein the holding elements are simultaneously actuable via the first actuating device. By use of a plurality of holding elements, temporary fixing of the door on the receiving device can be improved, in particular since holding forces for holding the door can therefore be better distributed over the door. A simultaneous actuation of the holding elements has the advantage that the holding elements can be brought simultaneously from a holding position into a release position and vice versa. The door can therefore be fixed on or released from the receiving device with just one actuation. A complicated manual and successive opening and closing of a plurality of holding elements is therefore omitted.

It is preferred, in the case of a device, that the guide device has a plurality of guide segments which are arranged next to one another with guide track segments, wherein the guide segments are arranged on the receiving device so as to be alignable relative to one another and/or releasable. The guide track is therefore formed from a plurality of guide track segments. The guide track segments are preferably fixable relative to one another here, and therefore an unintentional change in a course of the guide track is prevented. Guide segments of this type are, for example, exchangeable separately. This is of advantage in particular in the case of damaged or defective guide segments since the complete guide device does not always have to be exchanged. The outlay on exchange and exchange costs can thereby be reduced.

It is furthermore preferred, in the case of a device, for the receiving device to be formed rigidly. Within this context, a rigid formation means that, in particular when the door is arranged on the receiving device or in the case of a receiving device with a door arranged thereon, no distortion or only marginal distortion of the receiving device can occur. A marginal distortion does not have any substantial effect on the application accuracy of the door seal, and therefore the technical functions of the door seal are ensured. The receiving device is therefore preferably produced from a metal. A receiving device of this type has the advantage that the door seal can be arranged on the door with particularly high repetition accuracy since a relatively large distortion of the rigidly formed receiving device is not possible. It is therefore easily realizable that a relative position of a door, which is arranged on the receiving device, with respect to the guide device corresponds to a predefined relative position.

According to the invention, it can be provided, in the case of a device, that the rotation device has an electric motor which is actuable via a second actuating device, wherein the second actuating device is configured for foot actuation. The receiving device is easily rotatable by an electric motor for arranging the door seal on the guide track. A second actuating device configured for foot actuation can be configured, for example, as a foot pedal. The electric motor is actuable by a worker by such a second actuating device without said worker having to use his hands for this purpose. The worker can therefore employ his hands better for arranging the door seal on the guide track. Alternatively, the rotation device can also be actuable via a pneumatic motor or a hand crank, optionally with an auxiliary mechanism for easier handling.

The axis of rotation of the rotation device can preferably be oriented horizontally or substantially horizontally. The axis of rotation preferably runs approximately through a centerpoint surrounded by the guide track and at right angles or substantially at right angles to a receiving side of the receiving device for receiving the door. An axis of rotation of this type has the advantage that the door is rotatable relative to the worker in such a manner that the door seal faces the worker during the arranging on the guide track. The worker therefore always has a good view of the door seal and can easily position the door seal on the guide track. The door is rotatable here in such a manner that the door seal runs vertically or substantially vertically during the arranging. This has the advantage that, during the arranging, the door seal does not crease on account of the gravitational force. The application accuracy of the door seal can thereby be significantly improved.

According to a second aspect of the invention, the object is achieved by a system for applying a door seal to a door of a motor vehicle. The system has a device according to the invention according to the first aspect of the invention and an application device for applying the door seal to the door. The application device is preferably configured for bringing the door seal, for example a door sealing strand from a reel, up to the door in a targeted manner. Furthermore preferably, the application device is configured to press the door seal onto the door at a defined location. The application device is preferably configured to remove, for example to peel off, a protective element of an adhesive strip of the door sealing strand, such as, for example, a protective strip, a protective film or the like. Furthermore preferably, the application device is configured to remove and to dispose of the protective element of the adhesive strip after said protective element has been peeled off. The application device according to the invention is preferably configured to ensure a constant contact pressure of the door sealing strand against the door. The application device can be configured according to the invention to be actuable, for example, automatically or manually. The described system for applying a door seal to a door of a motor vehicle has all of the advantages which have already been described with respect to a device for aligning a door seal when the door seal is applied to a door of a motor vehicle according to the first aspect of the invention. In particular, the system has the advantage that the door seal can be arranged particularly precisely on the door. Furthermore, an application process can be carried out with the system substantially more rapidly than a conventional manual or manually assisted application of door seals.

According to a preferred development of the system according to the invention, it can be provided that the application device is guided along the guide track of the guide device in such a manner that a predetermined relative position of the application device to a door arranged on the receiving device is set by the guide device during the application of the door seal. The application device can therefore be coupled to the guide device, wherein the guide device defines a relative position of the application device with respect to the receiving device. When the application device is moved along the guide device, the application device is guided by the guide device into the respectively corresponding relative position. A relative position is defined by a setting angle of the application device with respect to the guide device and a position of the application device on the guide track. A guide of this type has the advantage that the application device always has an optimum position relative to the door, which is held on the receiving device, for applying the door seal. Particularly high application accuracy can thereby be achieved.

In the case of a system, the device preferably has a detection device which is configured for detecting a course of a door seal attached to the door. The detection device is configured for identifying a position of the door seal on the door or relative to the device, in particular to the guide device of the device. Positional deviations of the door seal because of a defective application can therefore be detected by the detection device directly during the application. The identified deviations can be compared with predetermined limit values by means of an evaluation unit of the system. When a limit value is exceeded, the system can optionally carry out or predetermine a correction for the further application of the door seal and/or can output an error message.

According to a third aspect of the invention, the object is achieved by a method for applying a door seal to a door of a motor vehicle by way of a device according to the invention, i.e. a device according to the first aspect of the invention. The method has the following steps:

arranging a door on a receiving device of the device,
fastening the door to the receiving device by way of at least one holding element of a holding device of the device,
arranging a beginning of a sealing strand at a location on the door that is predetermined or at least partially predetermined by a guide device of the device, and
applying the sealing strand to the door along a guide track predetermined by the guide device.

The receiving device is rotated in a direction of rotation about an axis of rotation during the application.

During the arranging, the door is removed, for example, from a hanging conveyor device and guided to the receiving device. During the arranging, the door can easily be aligned on the receiving device relative thereto via an aligning device, such as, for example, centering pins and/or aligning stops, and therefore the door has a defined position with respect to the receiving device. In particular, the guide device for guiding the door seal now has a defined position with respect to the door.

In order to prevent an unintentional change in the position of the door with respect to the receiving device, the door is secured on the receiving device by way of at least one holding element.

The beginning of the sealing strand is preferably arranged on a lower side of the door, wherein the lower side of the door is preferably pivoted here upward about the axis of rotation by approximately 90°. The worker therefore has a free view of the location on the door at which the door seal is arranged.

During the application of the sealing strand, the door seal is pressed against the door, for example manually, by a worker, and is therefore preferably adhesively bonded on said door by use of an adhesive strip of the door seal. The door is rotated here about the axis of rotation, and following sections of the sealing strand are aligned continuously along the guide track and applied to the door until the door has an encircling door seal. The beginning of the door seal and an end of the door seal are preferably aligned in an abutting manner with respect to each other or flush with each other and are preferably adhesively bonded to each other.

In the case of the method described according to the third aspect of the invention, all of the advantages which have already been described with respect to a device for aligning a door seal when the door seal is applied to a door of a motor vehicle according to the first aspect of the invention arise.

According to a fourth aspect of the invention, the object is achieved by a method for applying a door seal to a door of a motor vehicle by means of a system according to the second aspect of the invention. The method has the following steps:
- arranging a door on a receiving device of the device,
- fastening the door to the receiving device by way of at least one holding element of a holding device of the device,
- arranging a beginning of a sealing strand at a location on the door that is predetermined or at least partially predetermined by a guide device of the device, and
- applying the sealing strand to the door along a guide track predetermined by the guide device by way of the application device of the system.

The receiving device is rotated in a direction of rotation about an axis of rotation during the application.

The method according to the fourth aspect of the invention differs from the method according to the third aspect of the invention in particular in the feature that the application is undertaken by way of an application device.

The described method according to the fourth aspect of the invention has all of the advantages which have already been described with respect to a device for aligning a door seal when the door seal is applied to a door of a motor vehicle according to the first aspect of the invention. The application by an application device has the further advantage that particularly high application accuracy and application speed are achievable.

A device according to the invention for aligning a door seal when the door seal is applied to a door of a motor vehicle, and a system according to the invention for applying a door seal to a door of a motor vehicle are explained in more detail below with reference to drawings.

Other objects, advantages and novel features of the present invention will become apparent from the following detailed description of one or more preferred embodiments when considered in conjunction with the accompanying drawings.

Elements having the same function and manner of operation are in each case provided with the same reference signs in FIGS. 1 to 5.

DETAILED DESCRIPTION OF THE DRAWINGS

Figure 1:
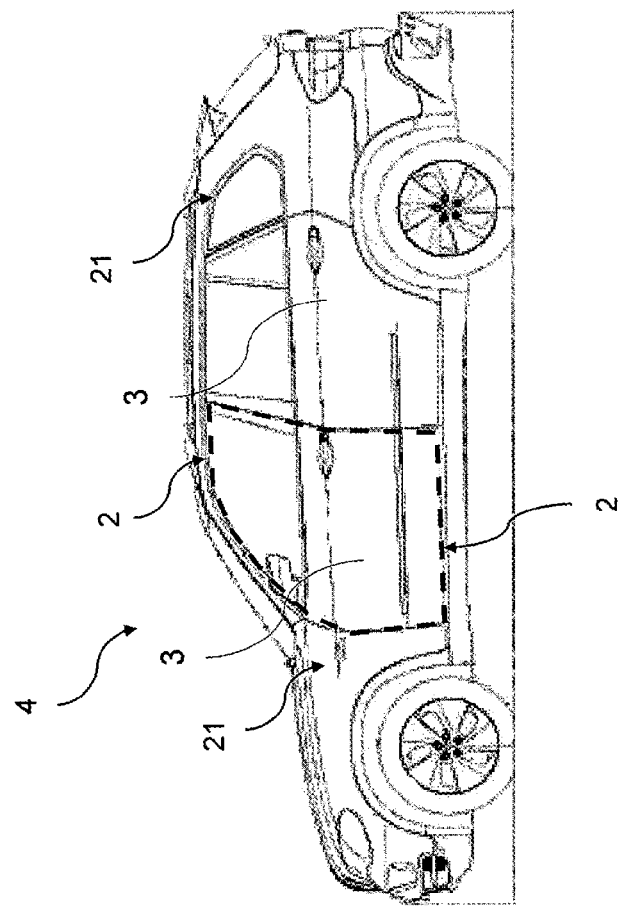
FIG. 1 is a side view of a motor vehicle with a door seal.

FIG. 1 schematically illustrates a side view of a motor vehicle 4. The motor vehicle 4 has four doors 3, each having an encircling door seal 2, which is concealed in this view by the doors 3. A position of a door seal 2 is identified by a dashed line.

Figure 2:
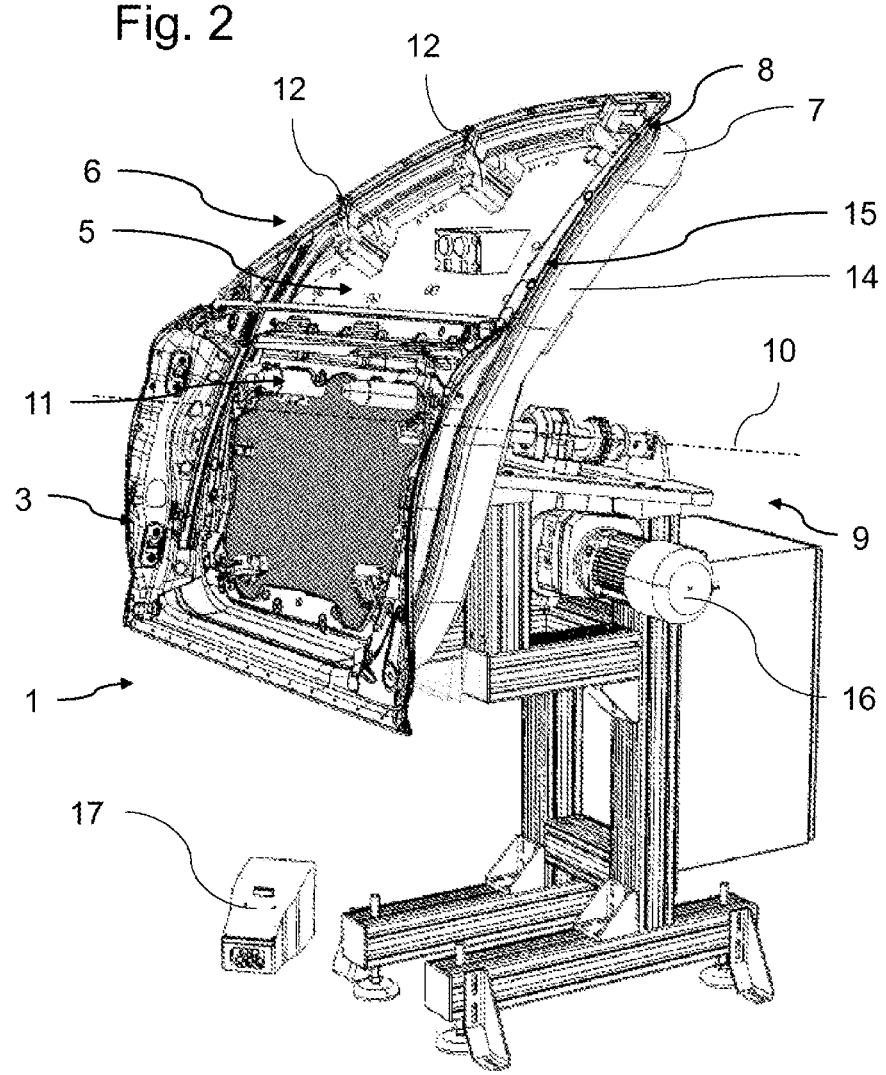
FIG. 2 is a perspective illustration of a front side of an embodiment of the device according to the invention.

FIG. 2 schematically shows a perspective view from the front of a preferred embodiment of a device 1 according to the invention for aligning a door seal 2. The device 1 has a receiving device 5 on which a door 3 is arranged. The receiving device 5 is rotatable together with the door 3 about a substantially horizontally running axis of rotation 10 by way of a rotation device 9 of the device 1. For rotating the receiving device 5, the rotation device 9 has an electric motor 16 which is actuable via a second actuating device 17 configured as a foot pedal.

An aligning device 11 which has two aligning studs, which are arranged next to each other, for aligning the door 3 during the arrangement on the receiving device 5 is arranged on one side of the receiving device 5. Furthermore, a holding device 6 with a plurality of holding elements 12 which are configured as clamping elements for securely clamping the door 3 is arranged on the receiving device 5. The door 3, which is aligned on the aligning device 11, is temporarily fixed on the receiving device 5 in a predefined relative position with respect to the receiving device 5 by way of the holding device 6. The holding elements 12 are actuable, preferably simultaneously, via a first actuating device 13 (cf. FIG. 3).

A plurality of guide segments 14 each having a guide track segment 15 are arranged and fixed on an encircling border of the receiving device 5 in such a manner that the guide segments 14 form a common guide device 7 with an encircling and continuous guide track 8. A course of a door seal 2 to be arranged on the door 3 is defined via the guide track 8.

Figure 3:
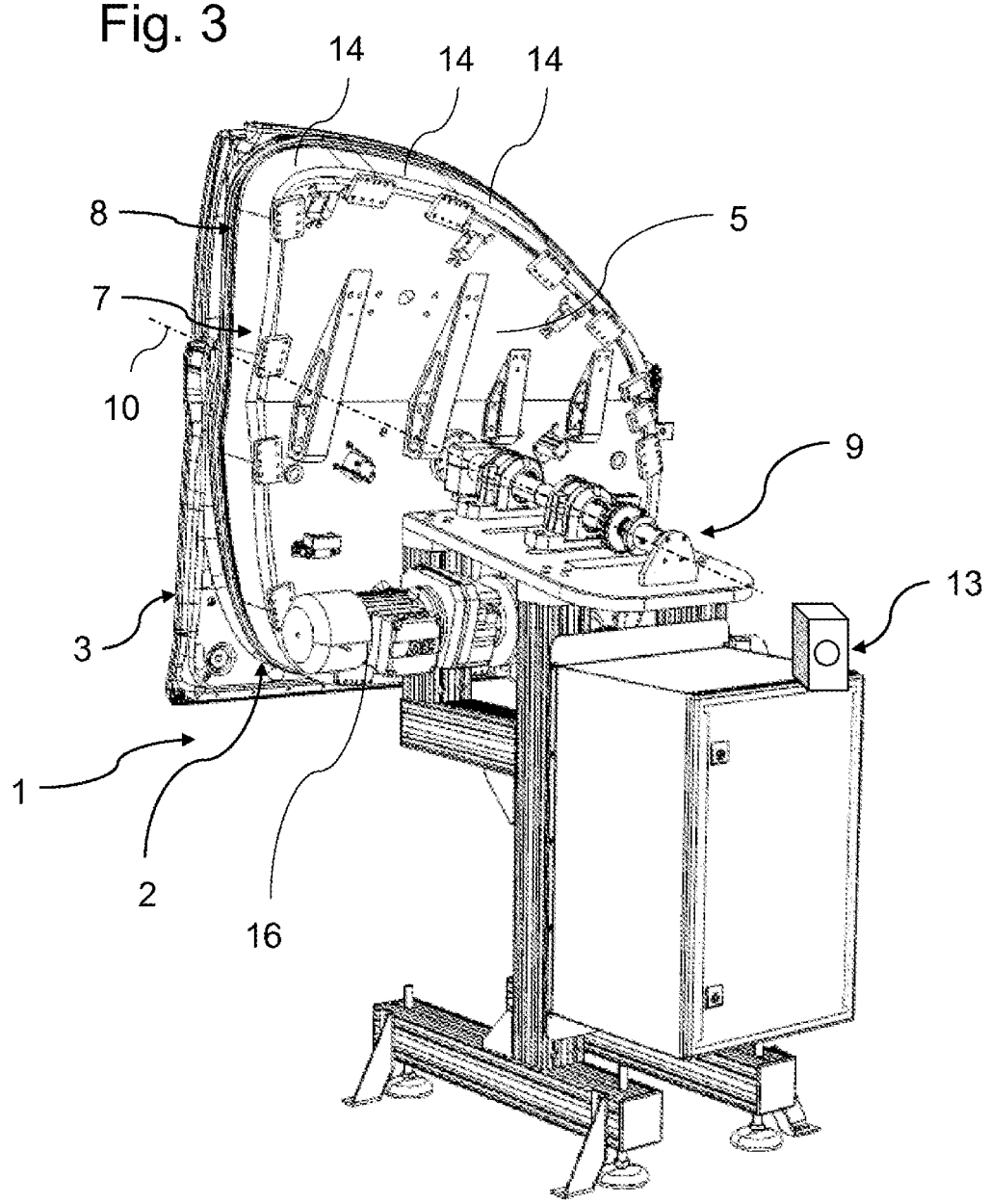
FIG. 3 is a perspective illustration of a rear side of the device according to the invention from FIG. 2.

In FIG. 3, the device 1 from FIG. 2 is shown schematically in a perspective view from the rear. In this illustration, a door 3 is likewise arranged on the receiving device 5 and is temporarily fixed on the receiving device 5 via the holding device 6 (not visible in this perspective) or via the holding elements 12 of the holding device 6 (cf. FIG. 2). Only a border region of the door 3 can be seen since the remaining part of the door 3 is concealed by the receiving device 5. In this view, the guide track 8 of the guide device 7 can readily be identified. In a region which is defined by the guide track 8 and the door 3, the door seal 2 is arranged in contact with the door 3 and is therefore already applied to the door 3.

Figure 4:
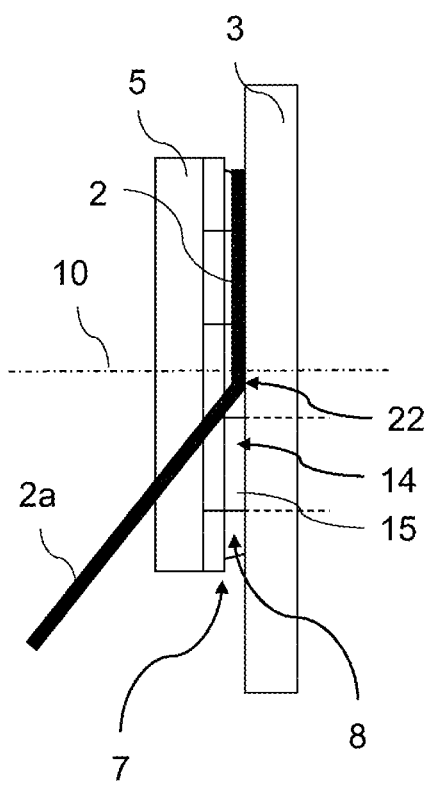
FIG. 4 is a side view of the device according to the invention when a door seal is applied to a door.

FIG. 4 shows an embodiment of the device 1 according to the invention when a door seal 2 is applied to a door 3, wherein some components are not shown for the sake of better clarity. The door 3 is held on the receiving device 5, and therefore a defined region for the arrangement of the door seal 2 is provided by the guide track 8 of the guide device 7 and the door 3. For the application of the door seal 2, a sealing strand 2a is provided which can be arranged along the guide track 8 on the door 3 and can be fixed onto the door 3 by being pressed thereon, for example via an adhesive strip of the sealing strand 2a. The pressing on can be undertaken, for example, manually by a worker. During the arranging of the door seal 2 on the door 3, the door 3 is rotatable about the axis of rotation 10 via the rotation device 9. The door 3 is rotatable here in such a manner that a contacting point 22 at which the guide track 8 enters into contact with the sealing strand 2a lies in the field of view of the worker or is easily reachable by the worker, for example with his hands. The door 3 is preferably rotatable in such a manner that the contacting point 22 is always arranged on one side of the device 1. It can clearly be seen in this view that the guide device 7 is composed of a plurality of guide segments 14.

Figure 5:
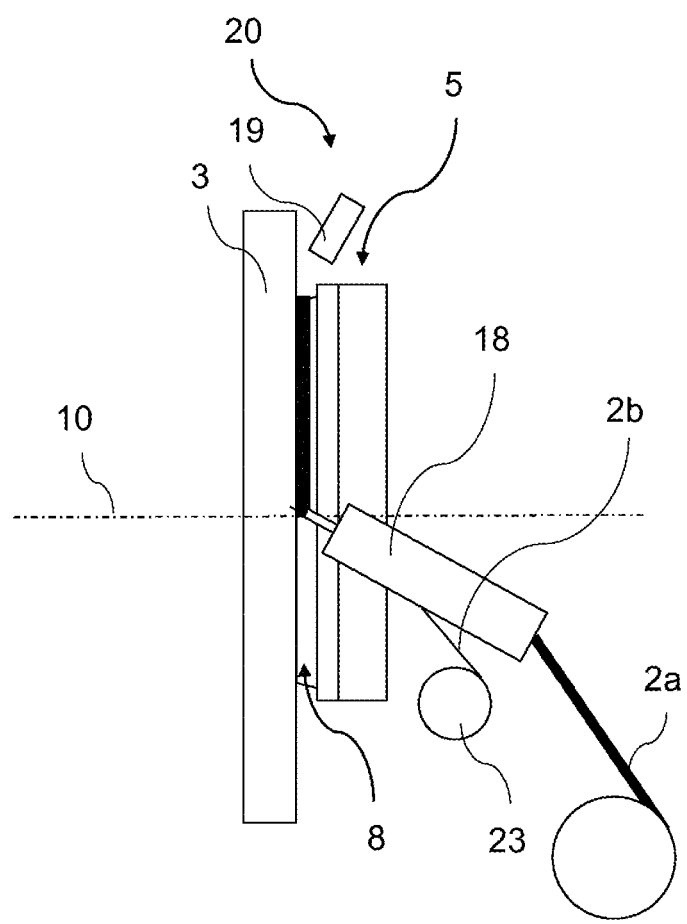
FIG. 5 is a side view of an embodiment of the system according to the invention when a door seal is applied to a door.

FIG. 5 schematically illustrates a preferred embodiment of a system 20 according to the invention when a door seal 2 is applied to a door 3, wherein some components are not shown for the sake of better clarity. In addition to the device 1 shown in FIG. 4, the system 20 has an application device 18 for automatically applying the door seal 2 by means of the sealing strand 2a. The application device 18 is configured to be aligned along the guide track 8 in order therefore to be correctly aligned at every location on the door 3 for arranging the door seal 2 on the door 3. It is therefore unnecessary in the case of the system 20 according to the invention for the guide track 8 to be arranged directly on the course of the door seal 2 on the door 3 since only a relative position of the application device 18 with respect to the door 3 has to be predetermined by the guide track 8.

In the case of the system 20 according to the invention, during the application, at least a correct alignment of the application device 18 with respect to the door 3 is arrived at during the application. Accordingly, according to the invention, a guide track 8 for guiding the application device 18, said guide track being spaced apart from the door 3, would also be conceivable in the system 20. For pressing the sealing strip 2a against the door 3, the system 20, in particular the application device 18, can have, for example, a pressure roller (not depicted). A collecting spool 23 for coiling up a protective strip 2b, which has been peeled off from the sealing strand 2a by way of the application device 18, is arranged on the application device 18. A collecting spool 23 has the advantage that the removed protective strip 2b is therefore easily guidable away from the sealing strand 2b, and therefore unintentional adhesive bonding of the protective strip between the door and the door seal 2 is avoided. Alternatively, a conducting-away device (not illustrated) for conducting away the protective strip 2b, in particular into a waste container, can be arranged on the application device 18.

In particular for checking a position of the applied door seal 2 on the door 3 and/or for checking the door seal 2 for damage, the system 20 has a detection device 19 which is arranged on the guide track 8 in a manner spaced apart from the application device 18 and is directed at the door seal 2 which has already been applied. The detection device 19 can be arranged, for example, in a fixed position within the system 20. The detection device 19 is preferably mounted or guided in such a manner, e.g. along the guide track, that the detection device 19 always has a constant position relative to the detected door seal 2. The detection device 19 can have, for example, optical detection devices, such as, for example, a CCD sensor.

LIST OF REFERENCE SIGNS

1 Device
2 Door seal
2a Sealing strand
2b Protective strip
3 Door
4 Motor vehicle
5 Receiving device
6 Holding device
7 Guide device
8 Guide track
9 Rotation device
10 Axis of rotation
11 Aligning device
12 Holding element
13 first actuating device
14 Guide segment
15 Guide track segment
16 Electric motor
17 second actuating device
18 Application device
19 Detection device
20 System
21 Body
22 Contacting point
23 Collecting spool The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for applying a door seal to a door of a motor vehicle, the method comprising the steps of:
    arranging a door on a receiving device that receives the door in a defined manner;
    fastening the door to the receiving device via at least one holding element of a holding device, wherein the holding device is arranged on the receiving device;
    arranging a beginning of a sealing strand at a location on the door that is predetermined or at least partially predetermined by a guide device, wherein the guide device has a guide track and wherein the guide device is arranged on the receiving device; and
    applying the sealing strand to the door along the guide track of the guide device, wherein the receiving device is rotated in a direction of rotation about an axis of rotation during the application.

2. A method for applying a door seal to a door of a motor vehicle, the method comprising the steps of:
    arranging a door on a receiving device that receives the door in a defined manner;
    fastening the door to the receiving device via at least one holding element of a holding device, wherein the holding device is arranged on the receiving device;
    arranging a beginning of a sealing strand at a location on the door that is predetermined or at least partially predetermined by a guide device, wherein the guide device has a guide track and wherein the guide device is arranged on the receiving device; and
    applying the sealing strand to the door along the guide track of the guide device, via an application device, wherein the receiving device is rotated in a direction of rotation about an axis of rotation during the application.

* * * * *